Jan. 26, 1965 R. E. BUCK 3,167,325
ADAPTER FOR MOUNTING EXPANDING MANDREL ON A CHUCK
Filed Oct. 31, 1963 2 Sheets-Sheet 1

INVENTOR.
RUSSELL E. BUCK
BY
Woodhams, Blanchard & Flynn
ATTORNEYS

Jan. 26, 1965  R. E. BUCK  3,167,325
ADAPTER FOR MOUNTING EXPANDING MANDREL ON A CHUCK
Filed Oct. 31, 1963  2 Sheets-Sheet 2

INVENTOR.
RUSSELL E. BUCK
BY
Woodhams, Blanchard & Flynn
ATTORNEYS

United States Patent Office 3,167,325
Patented Jan. 26, 1965

3,167,325
ADAPTER FOR MOUNTING EXPANDING
MANDREL ON A CHUCK
Russell E. Buck, Scotts, Mich., assignor to Buck Tool
Company, Kalamazoo, Mich., a corporation of
Michigan
Filed Oct. 31, 1963, Ser. No. 320,283
6 Claims. (Cl. 279—1)

This invention relates to a mounting device for a workholding mandrel and it relates particularly to a mounting device capable of itself being mounted directly on a standard chuck, preferably a power chuck.

While the mounting device of the invention was specifically designed for mounting a workholding mandrel operable from a drawbar onto a power chuck, it will be recognized as the description proceeds that the device of the invention is capable of mountingly receiving a variety of devices utilizing a drawbar and is itself capable of being mounted upon chucks of other types than a power chuck. Therefore, although the application of the invention to the mounting of a drawbar operated workholding mandrel and the support of the mounting device itself on a drawbar operated power chuck will be utilized to illustrate the invention, the broader aspects of the invention will be recognized and the adaptability of the invention to such broader applications will be understood.

In the mounting of the drawbar operated workholding mandrel it is customary for such to be mounted upon the same mounting means as that which normally supports a drawbar operated power chuck. Thus, a given lathe may be used interchangeably with such a chuck or such a mandrel and as is customary for the lathe to be supplied with the mandrel or chuck according to the type of workpiece to be acted upon by the lathe.

While the interchanging of the mandrel and the chuck is not a particularly difficult task, especially in the smaller sizes, and has been accepted as standard practice, nevertheless, it is time consuming and, particularly where the larger sizes are involved, it may require the use of special equipment such as lifting means for supporting the chuck while it is being removed from the lathe. Sometimes with the very large chucks the interchanging of a mandrel and lathe may require as much as four or five hours. While this loss of time is highly undesirable in a production shop, it has nevertheless in the past been accepted as inevitable and has been tolerated.

Accordingly, the objects of the invention include:

(1) To provide a mandrel mounting device for a workholding mandrel which is capable of itself being mounted directly onto a power chuck with actuation of the chuck being utilized to actuate the workholding functions of the mandrel.

(2) To provide a mandrel mounting device, as aforesaid, which can be mounted directly upon the face of a chuck, particularly a drawbar operated power chuck, with a minimum expenditure of time.

(3) To provide a mandrel mounting device, as aforesaid, which can be mounted directly upon the face of a chuck, and wherein the radial movement of the jaws of the chuck can be utilized to operate the workholding functions of the mandrel.

(4) To provide a mandrel mounting device, as aforesaid, particularly applicable to a drawbar operated power chuck wherein the operation of the lathe drawbar will act through the chuck onto the work engaging means of the mandrel and operate same to engage and disengage a workpiece.

(5) To provide a mandrel mounting device, as aforesaid, which can be mounted directly onto the chuck and preferably which can be mounted thereon with no change in the chuck whatever other than, if necessary, the removal of any special workholding devices from the chuck and the placement thereon of ordinary top jaws.

Other objects and purposes of the invention will become apparent to persons acquainted with apparatus of this general type upon reading the following disclosure and inspecting the accompanying drawings.

*General description*

In general the invention consists of a carriage fastened to the face of the desired chuck and having radially movable force receiving means engageable by the chuck jaws for actuation upon appropriate inward or outward movement of said jaws. The device includes also a drawbar actuating device to which is fastened a drawbar of the mandrel. Suitable translating means are interposed operably between the force receiving means and the drawbar operating means by which movement of the force receiving means in response to movement of the chuck jaws will effect an actuation of the drawbar actuating means of such character as to move the mandrel drawbar and thereby move the workholding parts of the mandrel in a work engaging or work releasing direction.

*Detailed description*

Figure 1:
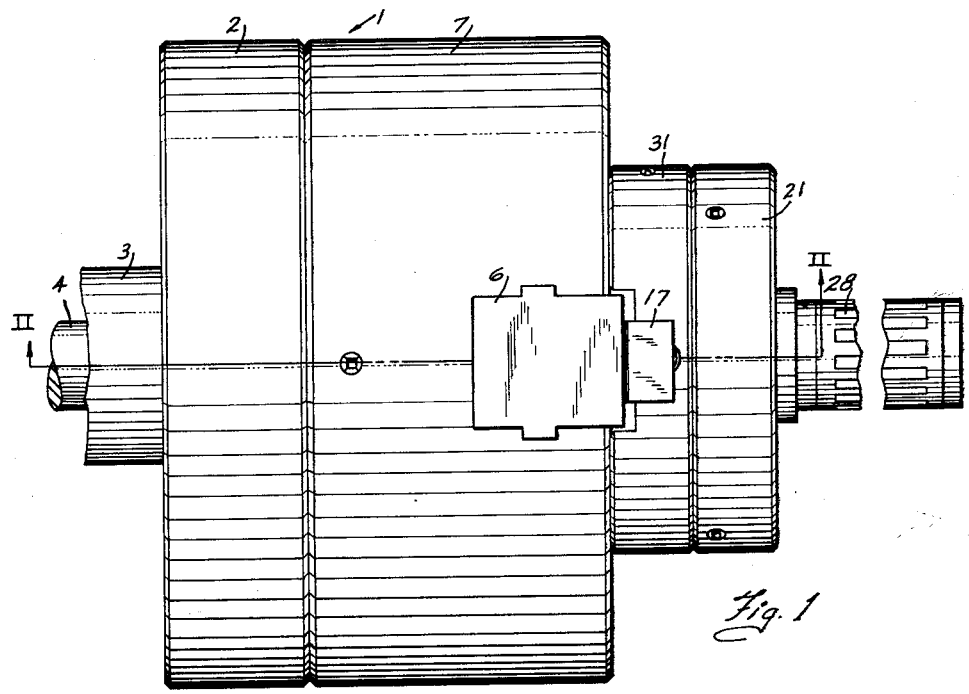
FIGURE 1 is a side elevational view of a chuck fitted with a mounting device of the invention and a workholding mandrel mounted in place.
Figure 2:
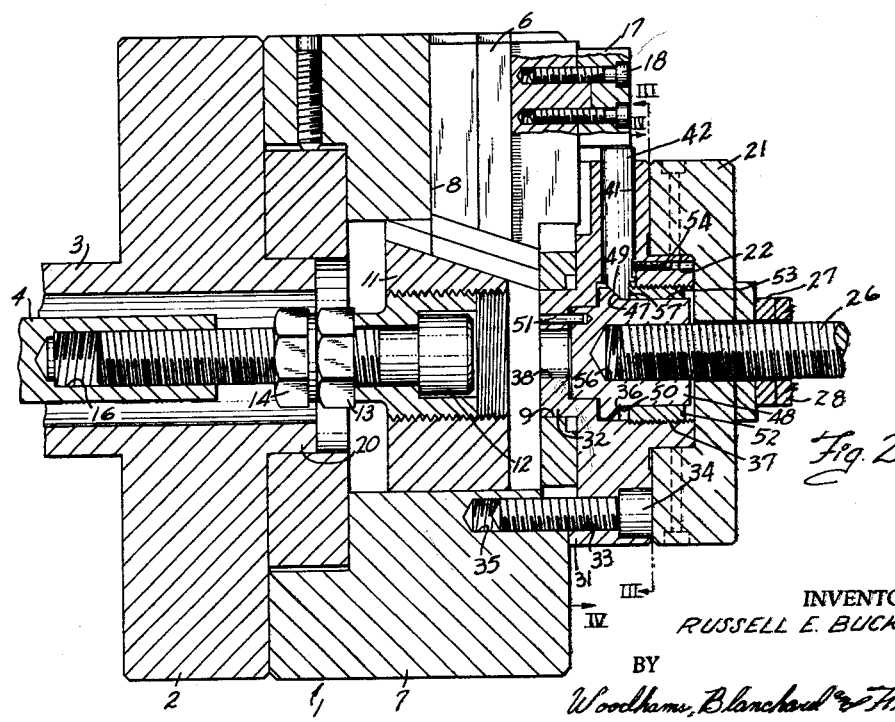
FIGURE 2 is a partially broken sectional view essentially taken on the line II—II of FIGURE 1.
Figure 3:
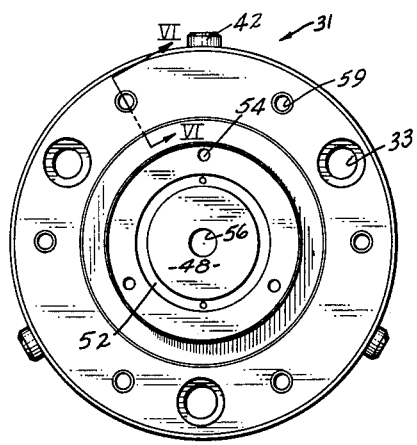
FIGURE 3 is an end view of the mounting device of the invention taken from the right-hand side of FIGURE 2 with the workholding mandrel removed and being essentially that view taken on the line III—III of FIGURE 2.
Figure 4:
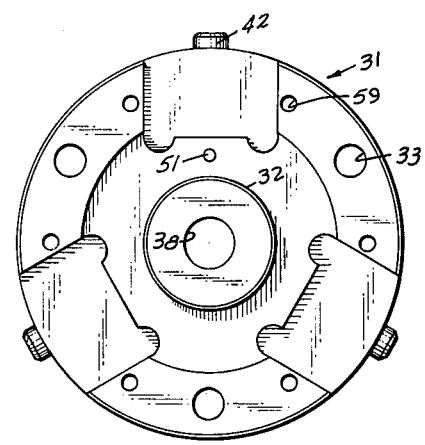
FIGURE 4 is a left-hand view of the mounting device of the invention taken from the side thereof facing the chuck and being essentially that view taken on line IV—IV of FIGURE 2.

Referring now in detail to the drawings, the following terminology will be used for convenience in reference and will be understood to be for such reference purposes only and to have no limiting significance. For example, the terms "rightward" and "leftward" will be used to denote directions in connection with the accompanying drawings. The terms "forward" and "rearward" will denote respective directions toward and away from the workpiece. Thus, the forward side of the chuck shown in FIGURES 1 and 2 is that face on the rightward end thereof. The terms "inward" and "outward" will denote directions toward and away from the geometric center of the apparatus. These terms will also include derivatives of the words above specifically mentioned and words of similar import.

Referring now to the drawings, there is shown for illustrative purposes a conventional power chuck 1 (FIGURES 1 and 2) mounted in a conventional manner on a lathe backplate 2 which backplate is driven by a suitable shaft 3. A conventional chuck operating or lathe drawbar 4 extends through the shaft 3 and the backplate 2 into the chuck 1 for the usual purposes.

In the particular chuck shown in the drawing, there is provided a plurality, here three, of master jaws 6 radially slidable within suitable openings 8 in the chuck body 7. The chuck body 7 has the usual cylindrical central opening 9 for the reception of a jaw operating wedge 11. Said wedge cooperates with the radially inner end of each of said jaws in a conventional manner such that leftward movement of the wedge 11 will effect radially inward movement of said jaws. Said wedge 11 is fastened in any convenient manner, such as by a bolt 12 which is held firmly in place on said wedge 11 by a nut 13 and lock nut 14 and which screws into a suitable, internally threaded opening 16 in the drawbar 4.

Examples of this general type of drawbar operated chuck are well known but reference might be made to U.S. Patent No. 2,859,044 or U.S. Patent No. 2,828,134 as specific examples thereof.

The master jaws 6 each carries a top jaw 17 which is fastened firmly in place thereon in any convenient manner, such as by screws 18.

The mandrel with which the mounting device of the invention is to be used may be any of several well-known types but the type here utilized to illustrate the present invention is a mandrel as shown and described in more detail in the application of J. R. Buck, Serial No. 191,950 and now Patent No. 3,117,797 and assigned to the same assignee as the present invention.

Figure 6:
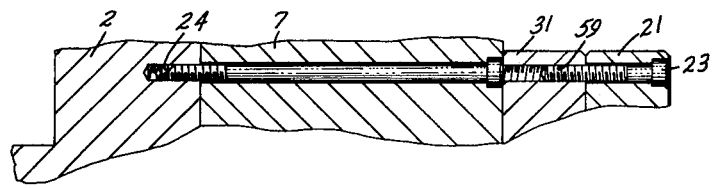
FIGURE 6 is a fragmentary sectional view of the apparatus of FIGURE 1 and essentially taken on the line VI—VI of FIGURE 3.

Said mandrel includes a body part 21 having an internal opening 22 (FIGURE 2) which is, in the aforementioned application Serial No. 191,950 and now Patent No. 3,117,-797, normally, piloted on the pilot 20 of the backplate 2. The mandrel body part 21 is fastened by a plurality of bolts of which one is indicated at 23 (FIGURE 6) to the backplate 2 by threaded engagement in openings of which one is indicated at 24. A mandrel drawbar 26 is threaded for normal engagement with the threading of the internal opening 16 in the lathe drawbar 4, extends through a guide 27 and acts on suitable mechanism (not shown) for effecting expansion of the mandrel jaws 28. Thus, in such previous constructions, the normal sequence for mounting the mandrel 21 is to remove the chuck 1 from the backplate 2, place the screws 23 into the screw openings 24, receive the pilot 20 into the central opening 22 and thread the drawbar 26 into the threaded opening 16 of the lathe drawbar 4. Thus, the mandrel 21 is mounted and ready for operation in the usual manner and as set forth in the above-mentioned application Serial No. 191,950 and now Patent No. 3,117,797.

The foregoing is previously known and has been set forth herein solely by way of example to illustrate the use of the present invention and to make possible a complete understanding of the invention.

Figure 5:
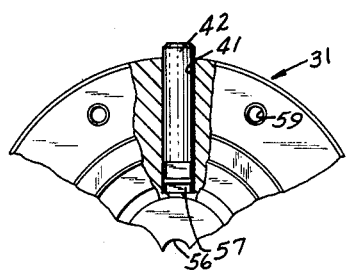
FIGURE 5 is a partially broken fragment of FIGURE 3.

Turning now to the present invention, the same is illustrated by the mounting unit body 31 having a pilot 32 thereon for reception into the central opening 9 of the chuck 1. Said mounting body 31 is provided with a plurality of openings of which one is indicated at 33 for the passage of a plurality of screws 34 into suitably threaded openings 35 in the chuck body 7. The mounting body 31 has a central opening 36 of which the outer end 37 is threaded and the inner end 38 is of reduced diameter. In some instances the inner portion 38 may be eliminated entirely inasmuch as its sole purpose is as an access opening as set forth further hereinafter. A plurality of radial openings, one of which is indicated at 41 (FIGURE 5), are provided extending from the central opening 36 outward through the outer periphery of the mounting body 31. Said openings are equal in number to the jaws of the chuck 1 and are positioned when the mounting body 31 is in operating position on the chuck body 7 in both longitudinal and radial alignment with said chuck jaws. Suitable actuating pins, one of which is indicated at 42, are slidably located within the openings 41, extend normally to a position as shown slightly beyond the periphery of the mounting body 31 and extend slightly inwardly of the surface defining the central opening 36. The inner ends of each of said actuating pins 42 has a tapered surface facing rearwardly.

A drawbar actuator 48 is received within the central opening 36 and is provided with a series of angular positioned, flat, surfaces of which one appears at 49, which cooperate with the inner tapered ends 47 of the actuating pins 42 in such a manner that radially inward movement of said actuating pins 42 will effect axially rearward movement of the drawbar actuator 48. In the present embodiment the drawbar actuator 48 is provided with a generally conical surface indicated at 50 with suitable flat areas provided thereon for cooperation with the pins 42. Alternatively, however, the periphery of the zone occupied by the drawbar surfaces 49 may be cylindrical with suitably tapered channels placed therein for reception of the pins 42. A pin 51 may be provided from the mounting body 31 into the drawbar actuator 48 to prevent rotation of the latter with respect to the former if desired but same normally will not be necessary.

A retainer 52 is externally threaded for reception into the threads at the forward end 37 of the central opening 36 and is internally smooth for the slidable reception thereinto of a portion 53 of said actuator 48 of reduced diameter.

A plurality of pins of which one is indicated at 54 extend through the body portion of the mounting body 31 into appropriate grooves in the actuating pins 42, said grooves being of sufficient length to permit the desired radial movement of said actuator pins 42 but said grooves and pins 54 will function to prevent the actuator pins 42 from becoming undesirably displaced when the mounting mechanism is removed from the chuck.

A suitably threaded internal opening 56 is provided within the actuator 48 for the threaded reception of the mandrel drawbar 26.

The mounting of the mounting device 31 to the chuck 1 is as indicated above and it is necessary only to note in addition that the jaws 17 of the chuck engage the radially outward ends of the actuator pins 42 whereby inward movement of the chuck jaws will effect correspondingly radially inward movement of said actuator pins 42 against the tapered surfaces 49 of the drawbar actuator 48 to effect leftward movement thereof. It will be noted that the forward surfaces 57 of said pins 42 bear solidly against the rearward surfaces of the retainer 52 whereby to give said pins 42 solid support and corresponding accuracy of operation against the surfaces 49 of the drawbar actuator 48.

The mandrel 21 is mounted as shown with its screws 23 (FIGURE 6) being received into appropriately threaded openings 59 in the mounting device 31, and its drawbar 26 (FIGURE 2) being received into the threaded opening 56 of the drawbar actuator 48.

*Operation*

With the parts assembled as above described, the chuck jaws 17 may be operated in a conventional manner by normal axial movement of the lathe drawbar 4. This, when said jaws 17 are moved radially inwardly, will effect radially inward movement of the actuating pins 42 so that their tapered faces 47 will bear against the corresponding tapered faces 49 of the drawbar actuator 48. Said pins 42 are backed, as above mentioned, solidly against the retainer 52 so that their action against the drawbar actuator 48 is both accurate and powerful. This will effect rearward or leftward movement of the drawbar actuator 48 thereby moving the mandrel drawbar 26 leftwardly and effect the appropriate operation of the mandrel jaws 28 to engage a suitable workpiece (not shown). Rightward movement of the lathe drawbar 4 will in a conventional manner move the chuck jaws 17 radially outwardly which permits the pins 42 to move correspondingly outwardly. This permits rightward movement of the drawbar actuator 48 and a releasing of the mandrel jaws 28.

Although a particular preferred embodiment of the invention has been disclosed hereinabove for purposes of illustration, variations or modifications thereof lying within the scope of the appended claims are fully contemplated.

What is claimed is:

1. A mounting device for mounting a workholding mandrel having a drawbar onto a jaw chuck having several chuck jaws, comprising:

a body member adapted for mounting rigidly onto the face of a chuck;

a central opening within said body member and a drawbar actuating device slidably arranged therewithin and adapted for effecting actuation of said drawbar;

a plurality of radially movable means engageable with said chuck jaws;

translating means responsive to radial movement of said radially movable means for effecting axial movement of said actuating device whereby normal operation of said chuck may be utilized to effect work engaging or releasing operation of said mandrel.

2. The device defined in claim 1 wherein said radially movable means are pins and wherein said translating means include tapered inner ends on said pins and correspondingly tapered surfaces on said mandrel actuating device, said surfaces and said inner ends cooperating whereby radially inward movement of said pins will effect axial movement of said mandrel actuating device.

3. The device defined in claim 2 including a retainer which supports and guides said drawbar actuating device, said retainer bearing against said pins at the side thereof opposite the tapered surface of said pins whereby said retainer solidly backs said pins as same bear against the correspondingly tapered surfaces of said mandrel actuating device.

4. The device defined in claim 2 wherein said pins each has an essentially planar area adjacent to but outwardly spaced from their inner ends, said planar areas each being engaged by an adjustable limit screw which limits the movement of the corresponding pin and which prevents angular movement of said pin about its own axis whereby the surfaces comprising said translating means are maintained in alignment.

5. The device defined in claim 1 including first projecting pilot means on the face of the mounting device adjacent said chuck for piloting said mounting device on said chuck and second projecting pilot means on the face of said mounting device adjacent the workholding mandrel for mounting said mandrel on said mounting device.

6. The device defined in claim 1 including key pin means preventing said drawbar actuating device from rotation about its central axis with respect to said body member.

References Cited by the Examiner
UNITED STATES PATENTS 2,399,536   4/46   Baum _____ 279—1

OTHER REFERENCES

American Machinist, June 16, 1949, page 113.

ROBERT C. RIORDON, *Primary Examiner.*